United States Patent [19]

Bleday

[11] 4,275,859

[45] Jun. 30, 1981

[54] OPTICAL DOME PROTECTION DEVICE

[75] Inventor: Michael P. Bleday, Concord, Mass.

[73] Assignee: The United States of America as represented by the Secretary of the Air Force, Washington, D.C.

[21] Appl. No.: 104,923

[22] Filed: Dec. 18, 1979

[51] Int. Cl.$^3$ .............................................. B64C 1/10
[52] U.S. Cl. .................................... 244/121; 343/872
[58] Field of Search ............ 244/121, 1 R, 1 A, 53 B, 244/53 R; 343/872

[56] References Cited

U.S. PATENT DOCUMENTS

| | | |
|---|---|---|
| 3,524,608 | 8/1970 | Nicholson et al. ................... 244/1 A |
| 3,637,166 | 1/1972 | Nicholson ............................ 244/1 R |

FOREIGN PATENT DOCUMENTS 2214873  10/1973  Fed. Rep. of Germany ......... 244/52 B Primary Examiner—Robert B. Reeves
Assistant Examiner—Gene A. Church
Attorney, Agent, or Firm—Donald J. Singer; Arsen Tashjian

[57] ABSTRACT

A conical shaped, screen-like structured device that is positioned over, and forward of, the rain-erodible, thermal shock-susceptible optical dome of an optically guided missile which travels at varying speeds, from sub-sonic to and including supersonic, through an air environment in which raindrops are falling. This device provides raindrop erosion protection to the dome by fragmenting the raindrops before they impact on the dome; and, it also provides thermal shock protection to the dome by producing a region of relatively stagnant air forward of the dome, and within the device, which reduces the heating rate to the dome. The device allows the use of lower cost rain-erodible and thermal shock-susceptible materials for the optical dome.

10 Claims, 3 Drawing Figures

OPTICAL DOME PROTECTION DEVICE

STATEMENT OF GOVERNMENT INTEREST

The invention described herein may be manufactured and used by or for the Government for governmental purposes without the payment of any royalty therein.

BACKGROUND OF THE INVENTION

This invention relates to the rain erosion protection art and the thermal shock protection art and, more particularly, to a unique device for protecting the optical dome of the seeker system of an airborne vehicle, such as a missile.

One of the primary objects of a low cost lightweight missile (hereinafter referred to as "LCLM") is, obviously, the incorporation into the LCLM of low cost components. Hence, the ultraviolet/infrared transparent materials that were considered initially for use as the optical dome of a LCLM were Cortran 9754 (i.e., a tempered germanium doped glass) and quartz, both of which are relatively inexpensive. However, after a more detailed consideration, it was ascertained that both of these materials have limitations for use in the designated flight environment of the missile. That environment includes falling raindrops, and thermal shock at the flight velocities of the LCLM, which are variable from sub-sonic to (and including) supersonic.

For example, Cortran 9754 will begin to be damaged by erosion by the impact of raindrops during flight velocities of between 300 and 600 feet per second, and the rain damage velocity threshold of quartz is less than 400 feet per second. Additionally, quartz will not be affected by the thermal environment, whereas Cortran 9754 is subject to thermal shock, except for very thin configurations. Therefore, unless a solution is found which permits the use of Cortran 9754 and of quartz, substantially more expensive materials, such as magnesium oxide and sapphire, will have to be considered for use as the optical dome material.

I have invented a unique optical dome protection device which is inexpensive, and which will protect erodible materials, such as Cortran 9754 and quartz, from rain damage; and, which will also protect thermal shock-susceptible materials, such as Cortran 9754, from cracking due to the thermal environment. As a result, these and other inexpensive materials can be used with my invention to produce a low cost optical dome which will survive supersonic flights in rain. Therefore, with this invention I have satisfactorily solved the aforesaid existing problem; and, thereby, I have significantly advanced the state-of-the-art.

SUMMARY OF THE INVENTION

The invention is a rain and thermal shock protection device for a rain-erodible, thermal shock-susceptible optical dome of an optically guided airborne vehicle (e.g., a missile) that is travelling at varying speeds (i.e., from sub-sonic to, and including, supersonic speeds) through an air environment in which raindrops are falling.

Accordingly, the principle object of this invention is to provide a rain and thermal shock protection device for the use as set forth hereinabove.

Another object is to provide the described protection device which although joined to the airborn vehicle and partially obscuring the field of view, nevertheless will also permit viewing of approximately 80 percent or more of the area that is ordinarily viewable, i.e. discernable through the optical dome when the protection device is not joined to the airborne vehicle.

Other objects include providing such a protection device which will also be low in cost and light in weight, and which will have a small emissive area.

These objects, as well as other objects, of this invention will become readily apparent after a consideration of the description of the invention, together with reference to the figures of the drawings.

DESCRIPTION OF THE PREFERRED EMBODIMENT

Figure 1:
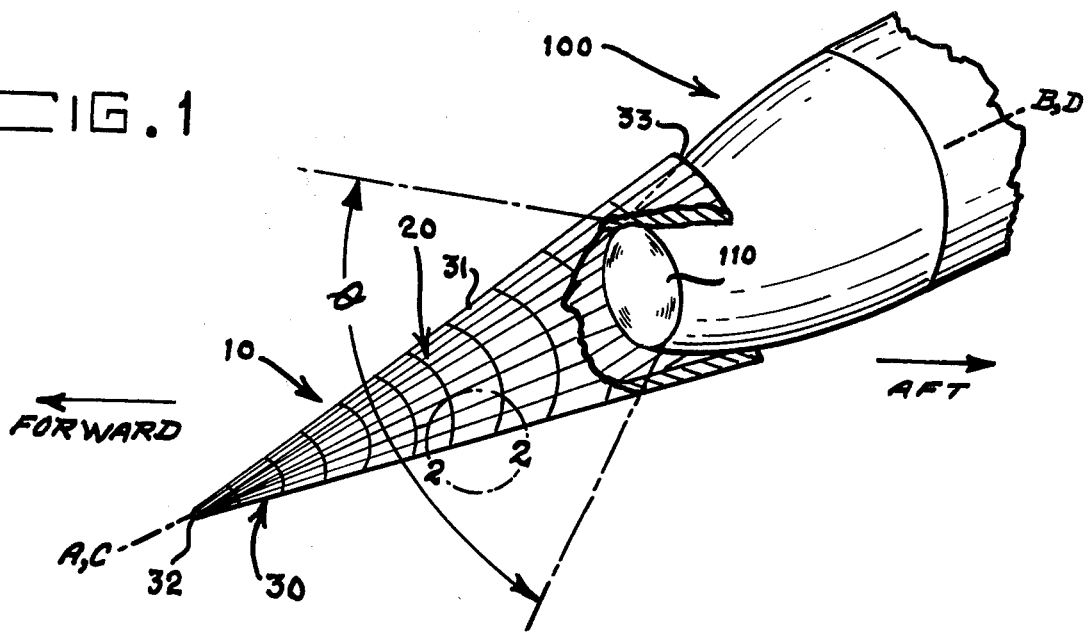
FIG. 1 is a perspective view, partially fragmented and in simplified schematic and pictorial form, of a preferred embodiment of my invention joined to the airborne vehicle with which it is intended to be used.
Figure 2:
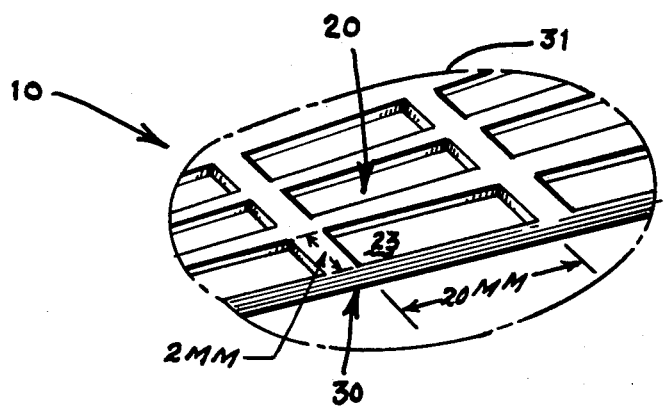
FIG. 2 is also a perspective view, in simplified form and partially fragmented, enlarged and in detail, of that portion of the preferred embodiment that is shown encircled in FIG. 1 and designated 2—2; and, FIG. 3 is a side elevation view, also in simplified pictorial and schematic form, of the airborne vehicle (to which has been joined my invention) travelling at a supersonic speed in its flight environment which includes falling raindrops. Slots have been omitted from the rear longitudinal portion of the preferred embodiment to maintain simplicity.
Figure 3:
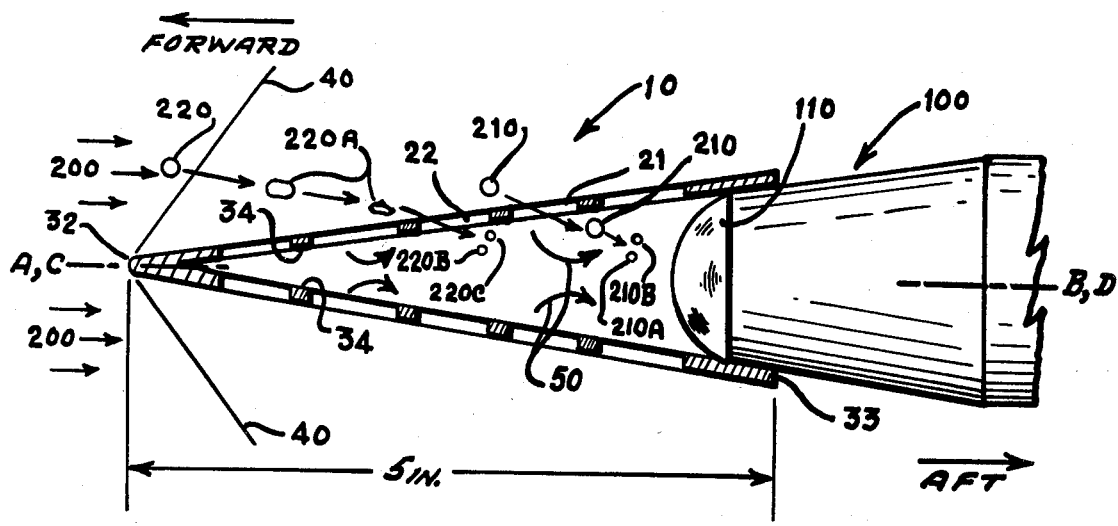

With reference to FIGS. 1, 2 and 3, therein is shown, in simplified form and in various views, the preferred embodiment 10 of my invention, a novel optical dome protection device.

As a preliminary matter, it is to be noted and remembered that the invention 10 is for use with an optically guided airborne vehicle (e.g., a missile), such as a designated 100 in FIGS. 1 and 2, and that the vehicle 100 has a longitudinal axis "A-B", and a rain-erodible, thermal shock-susceptible optical dome 110 that is positioned at its front tip. The vehicle 100 is travelling, as is shown in FIG. 3, through an air environment (generally designated 200) in which raindrops, such as 210 and 220, are falling. The speed of the vehicle 100 in that environment may vary between sub-sonic to, and including, supersonic.

In the most basic and generic structural form, my optical dome protection device comprises: (a) means (such as is generally designated 20) for fragmenting the falling raindrops, such as 210 and 220, that are falling in the above-described travel-through environment 200, before the falling raindrops reach the optical dome 110, with this means 20 disposed forward of the optical dome 110, and with this means 20 including a plurality of openings, such as representative ones 21 and 22, FIG. 3, and 23, FIG. 2, that are smaller than the falling raindrops; and, (b) means (such as is generally designated 30) for protecting the optical dome 110 from thermal shock, with this means 30 including a thermal resistant cone member 31 that is integrated with the raindrop fragmenting means 20, and with this cone member 31 disposed forward of, and attached to, the vehicle 100, such that the cone member 31 together with the raindrop fragmenting means 20 obscure less than twenty (20) percent of the viewing area throughout the total field-of-view (such as $\theta$, FIG. 1) of the seeker (not shown), that is viewing through the optical dome 110 of the airborne vehicle 100.

More specifically, the raindrop fragmenting means 20 and the thermal shock protecting means 30 are integrated and, as an integrated unit, comprise: the cone member 31 of the thermal shock protecting means 30, with the cone 31 being made of metal and having a closed forward tip 32 and an open aft base 33, and with the cone 31 joined to the vehicle 100 by, and at, the open base 33, such that the closed tip 32 is positioned forward of the optical dome 110, and the cone 31 surrounds the optical dome 110; and, the plurality of openings, such as 21, 22 and 23, of the raindrop fragmenting means 20, with all of the openings being similar and disposed on and through the cone member 31 of the thermal shock protecting means 30, and with all of the openings being located between the closed forward tip 32 and the open aft base 33 of the cone member 31. In essence, the integrated unit is conical in shape and screen-like in structure.

The metal cone 31 preferably has a thickness of approximately 0.3 of a millimeter, and has an inner surface 34 which, depending upon the priorities involved, is partially in a reflection-scattering roughened condition and partially in a low-emissivity shiny condition, or is entirely in a reflection-scattering roughened condition, or is entirely in a low-emissivity shiny condition. The cone 31 has an axis "C-D" that is coincident with vehicle axis "A-B", and that preferably is of a length of 5 inches for use with a particular LCLM.

Each of the plurality of similar openings, such as 21 and 22, FIG. 3, and 23, FIG. 2, in the metal cone member 31 is a slot that is preferably in the geometric form of a rectangle with a width of approximately (or of less than) 2 millimeters and a length of approximately 20 millimeters, as shown in FIG. 2. The depth of the slot is the thickness of the metal cone, i.e., approximately 0.3 of a millimeter.

MANNER OF OPERATION AND OF USE OF THE PREFERRED EMBODIMENT

The manner of operation and of use of the preferred embodiment 10, FIGS. 1, 2 and 3, of my optical dome protection device can be easily ascertained by any person of ordinary skill in the art from the foregoing description, coupled with reference to the Figures of the drawing.

For others, the following explanation is made.

Rain protection is given to the optical dome 110 by the device 10 in several ways. Firstly, the width of the longitudinal slots are so small so as not to allow large destructive raindrops from penetrating to the optical dome 110. As an example, with a width of 2 millimeters (which is about the average raindrop size), all larger drops will be fragmented by the slots. The slot size creates the primary mechanism for raindrop fragmentation at sub-sonic speeds. Secondly, at supersonic speeds, the raindrops must traverse the shock wave (such as is generally designated 40 in FIG. 3), whereupon the drops will begin being sheared for eventual fragmentation, such as is indicated by raindrop 220 as it moves across the shock wave 40 and assumes the shape indicated by 220A, and then fragments upon impacting with slot 22, with some of the fragments 220B and 220C passing through slot 22. Thirdly, if a drop (such as 210) penetrates a slot (such as 21), it will be introduced into a separate flow region (such as is generally designated 50) within the device 10, wherein the velocity is relatively slow. The unbalanced forces created on the raindrop 210 will fragment it (such as is indicated by raindrop fragments 210A and 210B of raindrop 210). This fragmentation mechanism is particularly effective at supersonic speeds.

In any event, after the raindrops have been fragmented, the fragments that impact on the optical dome 110 will not result in any damage whatsoever.

Thermal shock protection is given to the optical dome 110 by the device 10 by creating a separate flow 50 within the device 10. As a result, the heat transfer to the optical dome 110 at supersonic speeds is about 30 percent of the heat transfer without my device 10. Hence, materials such as Cortran 9754 would not be subjected to thermal shock. Additionally, the device 10 will afford separated flow at angle of attack as well.

It is to be noted by those not of ordinary skill in the art that there are optical considerations of my device 10 and its effects on the optical seeker system of the airborne vehicle 100. These considerations and effects include, but are not limited to, the emittance of the hot metal cone 31 of the device 10 on the detector signal, and solar reflection from the inner surface of the metal cone 31 of the device 10 on the detector signal.

As to the emittance, it depends upon the area of the emitter (the metal cone 31), the temperature, and the emissivity of the surface. The area of the metal cone 31 in the field of view $\theta$ is relatively small (i.e., less than 20 percent) and, as such, does not unduly affect the background noise. The temperature of the cone 31 will fall from the tip 32 going aft to the base 33. Temperatures of about 800° F. at the tip 32 will fall off to about 700° F. at the base 33. Since the emittance varies as the 4th power of the temperature, a 10 percent temperature reduction results in a 40 percent reduction in emittance. Low emissivities are desirable. For metals, this implies the use of shiny surfaces.

As to solar reflection, there are attitudes of the sun and of the inner surface 34 of the metal cone 31 whereby the sun rays can be reflected into the optical system. To reduce the effect of the reflections, the inner surface 34 of the metal cone 31 should be roughened, so that the reflections can be scattered.

Since the desirability of roughened surfaces to reduce solar reflections conflict with the desirability of shiny surfaces for low emittance, a compromise surface condition may have to be effectuated, taking into consideration the priorities involved.

CONCLUSION

It is abundantly clear from all of the foregoing, and from the Figures of the drawings, that the stated desired principal object, as well as other related stated and implied objects, of my invention have been achieved. For example, a related object achieved is that the conical shape of the optical dome protection device will substantially reduce missile drag, thereby yielding improved speed and range perfomance.

It is to be noted that, although there have been described and shown the fundamental and unique features of my invention 10 as applied to a preferred embodiment, various other embodiments, variations, adaptations, substitutions, additions, omissions and the like may occur to, and can be made by, those of ordinary skill in the art, without departing from the spirit of my invention. For example, although the cone member 31 is shown as having a sharp forward tip 32, that tip may be blunted; and the cone 31 member may comprise four individual, longitudinally-extending, quadrant portions which are joined to form the cone member 31. Also, the openings, such as representative ones 21 and 22, FIG. 3, and 23, FIG. 2, may be circles, ellipses, rhombuses, and the like, rather than rectangles, in applications requiring less than 80 percent open area, as long as they do not allow a spherical raindrop of the order of 2 mm to pass through unimpeded.

What is claimed is:

1. An optical dome protection device for use with an airborne vehicle having a forwardly positioned, rain-erodible, thermal shock-susceptible optical dome through which an area is viewable, wherein said vehicle is travelling at speeds from sub-sonic to supersonic through an air environment in which raindrops are falling, composing:
    a. means for fragmenting said falling raindrops before said raindrops reach said optical dome, wherein this raindrop fragmenting means is disposed forward of said optical dome and includes a plurality of openings smaller than said raindrops, whereby said optical dome is protected from erosion damage and destruction by said falling raindrops;
    b. and, means for protecting said optical dome from thermal shock, wherein the thermal shock protecting means includes a thermal resistant cone member integrated with said raindrop fragmenting means, with said cone member disposed forward of, and attached to, said vehicle, such that said cone member together with said raindrop fragmenting means obscure less than twenty percent of said area viewable through said optical dome.

2. An optical dome protection device, as set forth in claim 1, wherein said raindrop fragmenting means and said thermal shock protecting means are integrated, and as an integrated unit, comprises:
    a. said cone member of said thermal shock protecting means, with said cone member made of metal and having a closed forward tip and an open aft base, and with said cone member joined to said airborne vehicle by, and at, said open base, such that said closed tip is positioned forward of said optical dome, and such that said open aft base of said cone member surrounds said optical dome;
    b. and, said plurality of openings of said raindrop fragmenting means, with all of said openings similar in geometric form and disposed on, and through, said cone member of said thermal shock protecting means, and with all of said openings located between said closed forward tip and said open aft base of said metal cone member.

3. An optical dome protection device, as set forth in claim 2, wherein each of said plurality of similar openings in said metal cone member is a slot in the geometric form of a rectangle.

4. An optical dome protection device, as set forth in claim 3, wherein each said rectangular slot has a width of approximately 2 millimeters.

5. An optical device protection device, as set forth in claim 4, wherein said metal cone member has a thickness of approximately 0.3 of a millimeter.

6. An optical dome protection device, as set forth in claim 5, wherein each said rectangular slot has a length of approximately 20 millimeters.

7. An optical dome protection device, as set forth in claim 6, wherein said metal cone has an inner surface that is partially in a reflection-scattering roughened condition and that is partially in a low-emissivity shiny condition.

8. An optical dome protection device, as set forth in claim 6, wherein said metal cone has an inner surface that is entirely in a reflection-scattering roughened condition.

9. An optical dome protection device, as set forth in claim 6, wherein said metal cone has an inner surface that is entirely in a low-emissivity shiny condition.

10. An optical dome protection device, as set forth in claim 7, wherein said metal cone has an axis of a length of 5 inches.

* * * * *